Oct. 18, 1938.  A. C. FISCHER  2,133,441
APPARATUS FOR MAKING COMPOSITION STRIPS
Filed Feb. 19, 1930
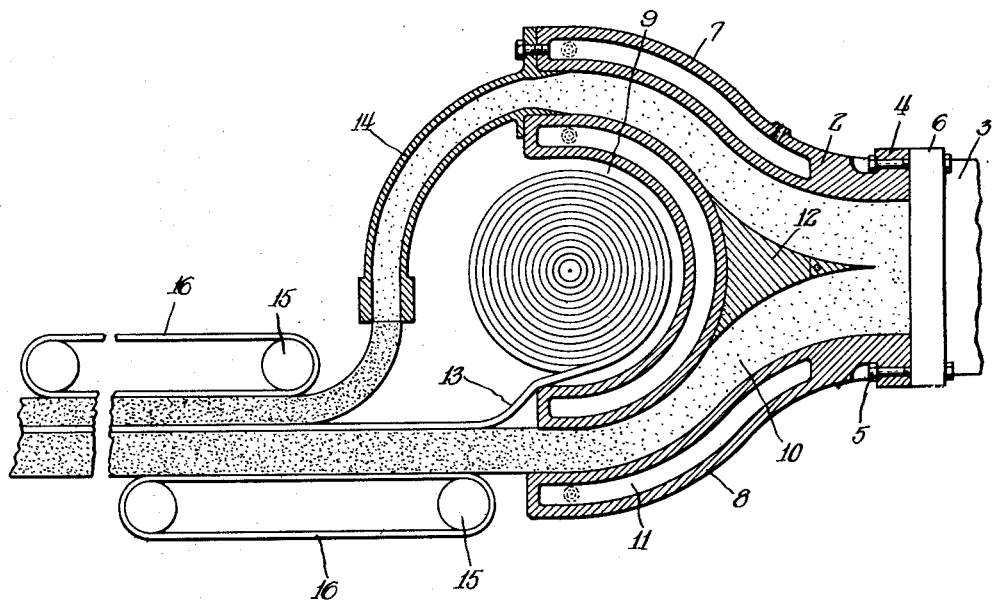
Inventor:—
Albert C. Fischer
By Albert F. Robinson
atty.

Patented Oct. 18, 1938

2,133,441

UNITED STATES PATENT OFFICE 2,133,441

APPARATUS FOR MAKING COMPOSITION STRIPS

Albert C. Fischer, Chicago, Ill.

Application February 19, 1930, Serial No. 429,557

4 Claims. (Cl. 154—1)

This invention relates to the fabrication of composition constructional strips, and particularly pertains to a laminated structure including a flexible reenforcing foundation layer and a surface covering or coverings of elastic and compressible material.

One of the objects of the invention is to fabricate in a continuous layer operation a composition strip composed of a plurality of layers of compressible and elastic material, such as rubber or bituminous material, fed from an extrusion machine in contact with a reenforcing foundation layer, and compressed into a composite laminated structure. The compressible and elastic material is extruded in a warm plastic condition, thereby securely bonding with the foundation sheet which may advantageously be a waterproof sheet, such as saturated felt.

With the foregoing objects in view and others to be mentioned hereafter, the invention consists in the novel and improved construction and arrangement of parts as described and claimed, and as illustrated in the accompanying drawing.

In the drawing the single figure is a view in elevation and partially in section of an apparatus embodying the invention.

Referring now to the drawing for a more particular description, the invention is typified by the manufacture of a composition strip, block or the like, which is adapted to be employed in the constructional material art, especially in building and paving, for surfacing and for separating rigid elements.

Numeral 2 designates an extruder head or die which may be attached to the end of an extruder 3 by means of an end flange 4 through which bolts 5 may be inserted to engage a similarly formed flange 6 on the extruder. The opposite end of the die is flared and divided into bifurcated legs 7 and 8 projecting around a central chamber 9. The bifurcated legs are each bored to divide the central bore into a plurality of passages through which plastic material 10 of rubber, bituminous compound or the like, may be extruded. In order to keep the plastic material in a warm flowable condition, the wall of the extruder head is recessed to provide a chamber 11 in which steam or other heating medium may be contained. Likewise the central chamber 9 is formed with a steam-jacket behind the semi-cylindrical wall thereof which serves to heat the plastic mass issuing from the passages and also serves to radiate heat onto the roll of sheet material contained in the chamber 9.

At the juncture of the bore in the bifurcated legs, an adjustable block 12 may be advantageously attached to the interior wall of the head in order to regulate and control the feed of the plastic material to each of the bores. The block may be adjusted in either direction to constrict the opening of one of the bores. In this way the thicknesses of the plastic layers may be controlled.

The plastic material is fed through the bifurcated bores in separate layers to be applied on opposite faces of a foundation sheet 13 which is fed from a supply roll in chamber 9. The foundation sheet is typified by a sheet of felt, preferably presaturated with waterproofing material. The upper bore of the extruder head may be advantageously extended by means of extension conduit 14, attached to the head, and projecting contiguous to the foundation sheet. In the present embodiment of the invention, the conduit 14 has been shown as having a lesser depth or thickness than the bore to which it is connected, thereby controlling the relative thickness of the two layers applied to the opposite faces of the foundation sheet.

After the plastic layers are applied to the surfaces of the foundation layer, the composite sheet is compressed and smoothed by a forming device. Suitable means for the purpose is typified by a series of rolls 15 over which endless belts 16 may be circumvolved.

Though I have described with particularity of detail a certain embodiment of the invention, yet it is not to be understood therefrom that the invention is restricted to the particular embodiment disclosed. Various modifications may be made by those skilled in the art without departing from the spirit of the invention.

I claim:

1. An apparatus for fabricating composition strips comprising an extrusion device including a head having a bore terminating in a plurality of outlets through which layers of plastic material are fed, and conduit means on the head for extending one of the outlets towards the other outlet and the layer issuing therefrom.

2. An apparatus for fabricating composition strips comprising an extrusion device including a head having a bore terminating in a plurality of outlets through which layers of plastic material are fed, a steam-jacketed substantially semi-cylindrical chamber formed in said head between said outlets and containing a rolled foundation sheet, and conduit means attached to one of the outlets in the head for directing the flow of plastic material issuing therefrom towards said other outlet and layer for application to the opposite sides of said foundation sheet.

3. In an apparatus for fabricating composition strips, an extrusion device including a head having a heated bore terminating in a plurality of outlets through which layers of warm plastic material are fed, a steam-jacketed substantially semi-cylindrical chamber formed in said head between said outlets for receiving a rolled foundation sheet, and conduit means attached to said head for extending one of the outlets towards the other outlet and the sheet of foundation material issuing from said chamber.

4. In an apparatus for fabricating composition strips, an extrusion device including a head having a bore terminating in a plurality of outlets through which layers of plastic material are fed, a chamber between the outlets for containing a rolled foundation sheet, and detachable conduit means attached to one of the outlets in the head and having an outlet opening of lesser depth than said one outlet for conducting the plastic layer issuing therefrom for application to one side on the sheet while the other layer of plastic material is applied to the other side thereof.

ALBERT C. FISCHER.